United States Patent [19]

Deutschlander et al.

[11] 4,181,213
[45] Jan. 1, 1980

[54] APPARATUS FOR FORMING STACKS OF FLAT ITEMS

[75] Inventors: Gert Deutschlander, Neuhausen am Rheinfall; Martin Low, Lohningen, both of Switzerland

[73] Assignee: SIG Schweizerische Industrie-Gesellschaft, Neuhausen am Rheinfall, Switzerland

[21] Appl. No.: 911,308

[22] Filed: Jun. 1, 1978

[30] Foreign Application Priority Data

Jun. 2, 1977 [CH] Switzerland ............................ 6812/77

[51] Int. Cl.² .................... B65G 47/26; B65G 57/00
[52] U.S. Cl. .................................... 198/419; 198/422
[58] Field of Search ............... 198/419, 422; 271/212, 271/198, 216, 233; 414/47, 28

[56] References Cited

U.S. PATENT DOCUMENTS

| 2,963,177 | 12/1960 | Shields | 198/422 |
| 3,117,667 | 1/1964 | Tichy | 198/419 |
| 3,194,382 | 7/1965 | Nigrelli | 198/419 |
| 3,416,641 | 12/1968 | Hollenton | 198/419 |
| 3,675,792 | 7/1972 | Griner | 198/419 |

Primary Examiner—Robert B. Reeves
Assistant Examiner—Brian M. Bond
Attorney, Agent, or Firm—Spencer & Kaye

[57] ABSTRACT

Stacks of flat items, such as cookies, are formed by conveying the items in successive pockets along a conveying path and moving vertical rod assemblies parallel to the conveying path but at a different speed from the pockets so as to cause the rods to engage items in each pocket and push them onto items in an adjacent pocket, whereby each rod assembly forms a stack of progressively increasing height as the pockets and rod assemblies travel along a common path.

15 Claims, 7 Drawing Figures

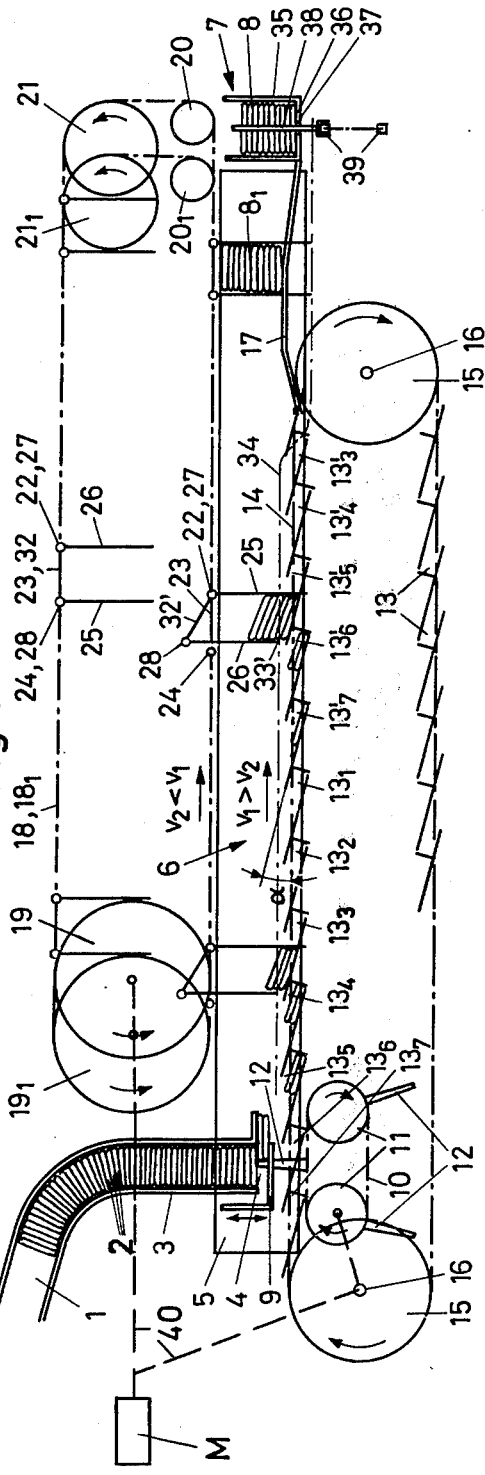
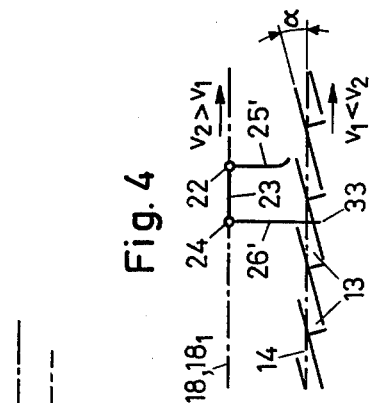
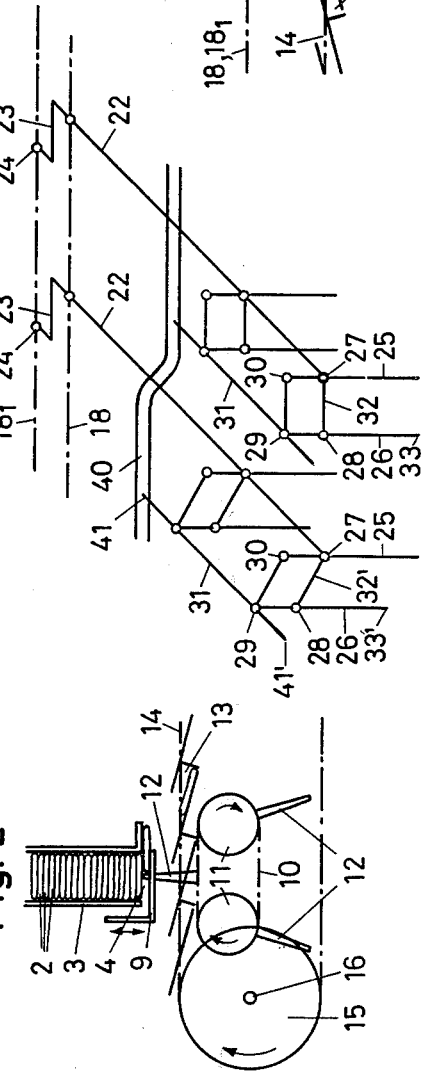

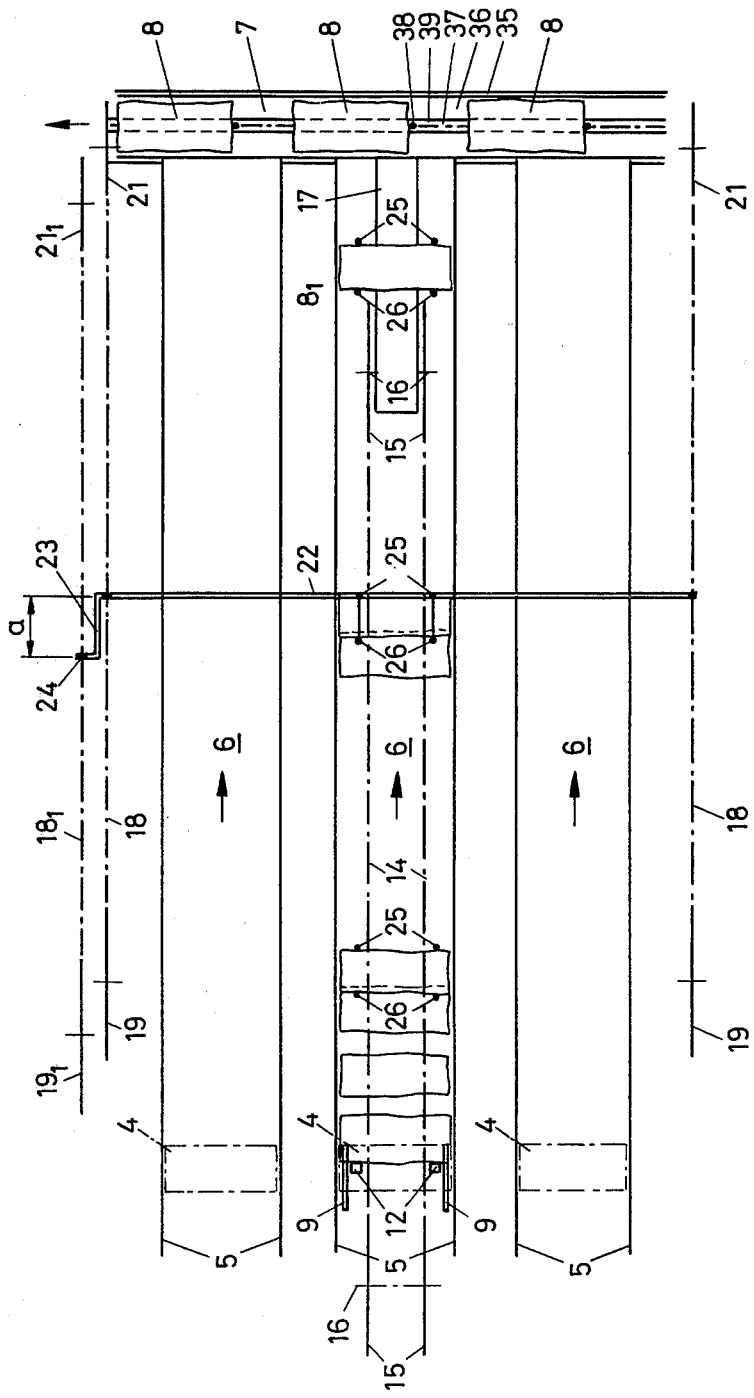

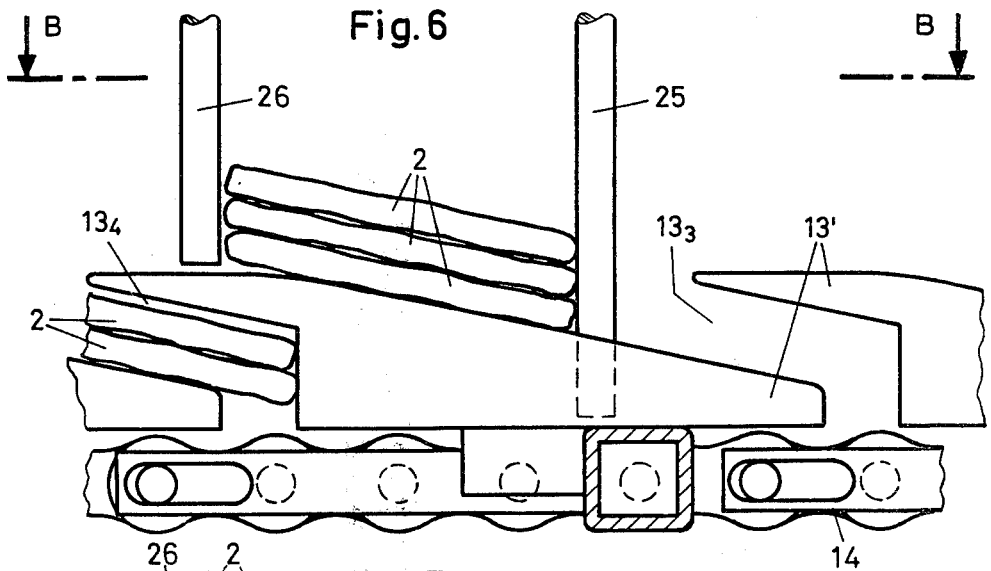
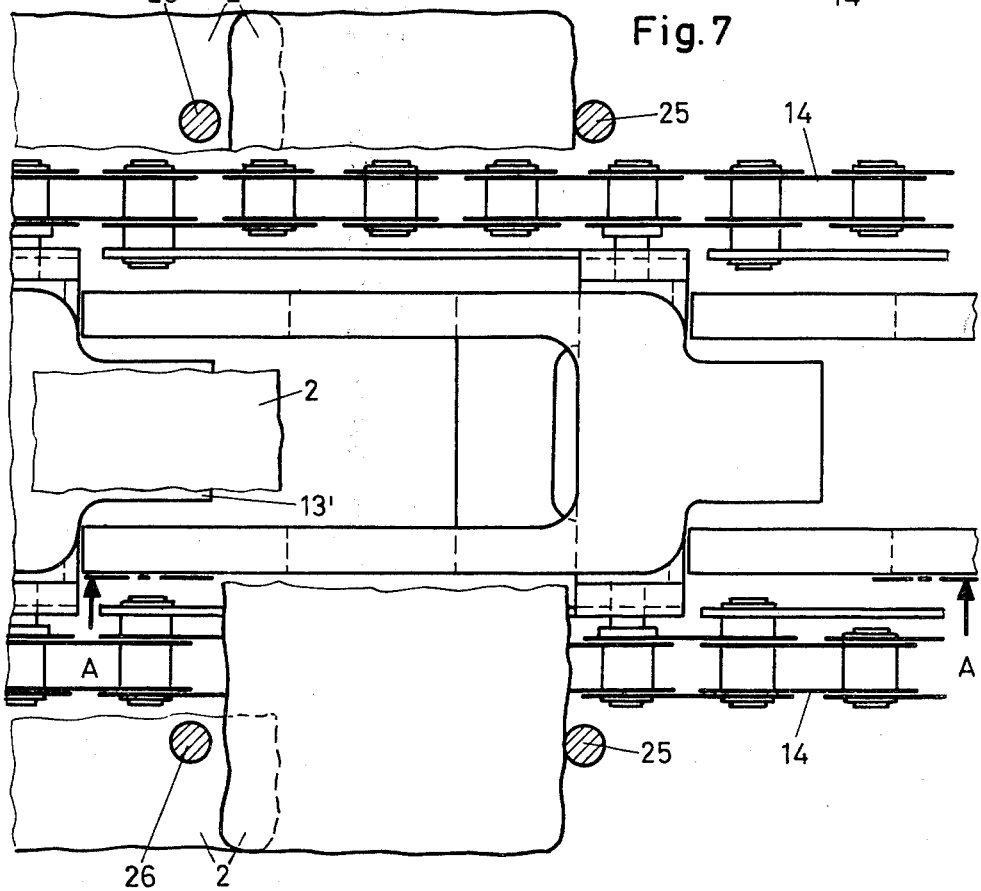

APPARATUS FOR FORMING STACKS OF FLAT ITEMS

BACKGROUND OF THE INVENTION

The present invention relates to an apparatus for forming stacks containing a counted quantity of flat items, e.g. cookies.

Known devices of this type, such as for example apparatus disclosed in Swiss Pat. No. 374,325 and counterpart British Pat. No. 914,018, have the drawback that they are not suitable for high speed performance, e.g. for the formation of more than 40 stacks per minute, because they are composed of many discontinuously moved parts which produce high mass forces or vibrations at high speed.

Other known devices having continuously moved parts are unsuitable for high speed performance and dependable operation because of the manner in which the items are handled and the stresses to which they are subjected.

SUMMARY OF THE INVENTION

It is therefore an object of the present invention to provide a device of the above-mentioned type in which the above-mentioned drawbacks are overcome so that a significant increase in operating speed can be realized.

These and other objects are achieved, according to the invention, by an apparatus which includes at least one endless chain defining a succession of pockets, feeding members provided at the beginning of the upper reach of the chain to successively feed the pockets with incoming flat items, and pairs of vertical rods disposed above the pockets and moved in the same direction as, but at a different speed than, the pockets, the rods being controlled to grip the item or items in one pocket and push them onto the item or items disposed in an adjacent pocket so as to form stacks composed of the items which are received by the vertical rods during their travel relative to the pockets along the upper reach of the chain.

BRIEF DESCRIPTION OF THE DRAWINGS

FIG. 1 is a side elevational view, partially in section, of a device for forming stacks of cookies according to a preferred embodiment of the invention.

FIG. 2 is a detail elevational view showing a portion of the device of FIG. 1 adjusted to a different setting.

FIG. 3 is a perspective kinematic linkage diagram of part of the device of FIG. 1.

FIG. 4 is a detail elevational view of a modified form of construction of a portion of the device of FIG. 1.

FIG. 5 is a top plan view of the device of FIG. 1.

FIG. 6 shows the pockets $13_3$ and $13_4$ of FIG. 1 in an enlarged side elevational view, partially in section, taken along the line A—A of FIG. 7.

FIG. 7 is a section along the line B—B of FIG. 6, wherein the biscuits are partially broken out.

DESCRIPTION OF THE PREFERRED EMBODIMENTS

Referring particularly to FIGS. 1 and 5, the illustrated stacking device has three parallel feed channels 1 for cookies 2 which are stacked one on top of the other in the end portions of the channels which are designed as vertical shafts 3. Each shaft has an outlet opening 4 via which cookies 2 leave the shaft. Only one channel 1 is seen in FIG. 1, while FIG. 5 shows, in dot-dash lines, only the outlet openings 4 of shafts 3.

Below each outlet opening 4, there begins a longitudinal path 6 which is defined by two vertical side walls 5 and which extends from the associated opening 4 to a transverse path 7. The cookies are stacked on the longitudinal paths 6 in a manner to be explained below. Then each stack 8 reaches the transverse path 7 and is conveyed therealong to the outlet of the device, which generally is connected to a packaging machine.

Beneath each shaft 3 there is disposed a bottom plate 9 which can be adjusted up and down and which is shown in FIG. 1 at a distance equal to the height of two cookies below opening 4. In FIG. 2 bottom plate 9 is shown to be set at a distance equal to the height of one cookie below opening 4. Along each path 6, two parallel endless chains 10 are disposed beneath bottom 9, which chains run over synchronously revolving chain, or sprocket wheels 11 and are each provided with three feeding fingers 12 which are capable of passing through slits in bottom 9, as shown in FIG. 5. In the setting of bottom 9 as shown in FIG. 1, each laterally adjacent pair of fingers 12 pushes two cookies 2 at a time away from opening 4, while with the setting shown in FIG. 2 only one cookie 2 is pushed at a time.

Each pushed-away cookie, or pair of cookies, 2 then reaches a respective open, inclined pocket 13 which is carried in an articulated manner between two endless chains 14 moving over chain wheels 15. The chains 14 and chain wheels 15 are shown in FIG. 5 only for the center longitudinal path 6. The chain wheels 15 of all paths 6 are mounted to the same two shafts 16, of which one is a driven shaft. Pockets 13 are shown in FIGS. 1 and 2 only along one part of chains 14, and not in the region of chain wheele 15. The pockets 13 are also provided with slits through which fingers 12 can pass.

From FIG. 6 it may be seen, that each pocket is constituted by two equal parts 13'. The synchronous operation of the pockets 13 with the vertical rods 25, 26 and the fingers 12 is obtained by the drive axle 40 (FIG. 1) attached to the drive motor M. The various gear ratios are chosen in such a manner. That synchronous movement is obtained. The same drive motor M may also be used to synchronously drive the chain 39 via chain wheels and a further drive axle which are not shown in the drawing.

FIG. 1 shows that the chain of pockets 13 forms the major portion of the "bottom" of longitudinal path 6. From a point shortly before the end of the longitudinal path 6, i.e. in the region of the chain wheels 15 at the outlet end, there extends a bottom piece 17 which is fixed to the machine frame and which initially riseds somewhat and then drops toward the transverse path 7.

Above and to both sides of the longitudinal paths 6 there extend two endless chains 18 each of which moves around three chain wheels 19, 20 and 21. A third upper chain $18_1$ is arranged next to one of chains 18 and is guided around three chain wheels $19_1$, $20_1$ and $21_1$ which are identical with chain wheels 19, 20 and 21 but are offset therefrom by a distance "a" (FIG. 5) in the longitudinal direction.

Chains 18 are provided to support the ends of transverse rods 22, of which only one is shown in FIG. 5, each rod end being connected to a respective one of the two chains 18. One of these ends is provided with an arm 23 of the length "a" which is connected with chain $18_1$ at a connection point 24. For forming each cookie stack 8 on each longitudinal path 6, two vertical abutment rods 25 and two vertical guide rods 26 are attached to each transverse rod 22. Each rod 25 and an associated rod 26 are connected together with connecting rods 32 in a parallelogram linkage having pivot points 27, 28, 29, 30 shown in FIG. 3 and are thus guided in parallel to one another. The pivot points 29 of associated rods 26 are connected together by means of a guide rod 31 which is parallel to transverse rod 22 and whose ends 41, 41' are guided in respective guides 40 which are fixed to the machine frame, as shown in FIG. 3 for one of guides 40.

The vertical orientation of abutment rods 25 is assured in that they are firmly connected with transverse rod 22 whose arm 23 remains horizontal during the synchronous, continuous movement of chains 18 and $18_1$. The guides 40 of rod 31, which guides are fixed to the machine frame, are so designed that each parallelogram 27–30 shifts during part of the advance of the chains in such a manner that its connecting rods 32 do not remain horizontal but are inclined as shown at 32'. The lowermost point 33 of each gripper rod 26 is thus pulled up into position 33' and follows the dot-dash path 34 shown in FIG. 1. Transverse rods 22 are attached at uniform intervals to chains 18 and $18_1$.

The transverse path 7 is defined by an end wall 35, disposed opposite the outlets of longitudinal paths 6, and a bottom 36 which is provided with a central slit 37. Grippers 38 which are fastened to an endless chain 39 moving in a vertical transverse plane pass through this slit. The assembly composed of grippers 38 and chain 39 can be designed in a manner well-known in the art.

In order to facilitate understanding of the operation of the above-described device, it should be noted that the pockets 13 which move continuously at a speed $V_1$ below shaft opening 4 form a series of steps which are inclined with respect to the horizontal at a small angle $\alpha$ of about 10°–30° and that the speed $V_2$ of the abutment and gripper rods 25, 26 moving above the pockets is less than $V_1$.

If the movement mechanism of the shaft bottom 9, which is known in the art and is not shown in detail, is set so that the feeding fingers 12 feed each of seven successive pockets $13_1$ through $13_7$ and $13'_1$ through $13'_7$ disposed ahead of pockets $13_1$ to $13_7$, with either one or two cookies, i.e. pockets $13_1$, $13_2$, $13_3$ and $13_7$ with one cookie and pockets $13_4$, $13_5$ and $13_6$ with two cookies, the same pattern existing for pockets $13'_1$ to $13'_7$, the relative speed $V_1-V_2$ will initially cause one cookie from each pocket $13_1$ and $13'_1$ to be stopped at its associated abutment rods 25 and to be shifted onto the cookies of the subsequent pockets. At the operating point shown in FIG. 1, one set of rods 25, 26 has picked up seven cookies and is approaching pocket $13'_6$ containing two cookies and the immediately succeeding set of rods 25, 26 has picked up three cookies and is approaching pocket $13_4$ containing two cookies. The leading set of rods will pick up the three cookies of the next following pockets $13'_6$ and $13'_7$ until finally a complete stack $8_1$ of ten cookies has been formed.

To produce this result, it is only necessary to synchronize the movement of wheels 19–21 and 19'–21' so that each set of rods 25–26 initially engages a pocket $13_1$ or $13'_1$ and to adjust $V_2$ and $V_1$ so that between the beginning and end of the common travel path of chain 14 and rods 25, 26, chain 14 will advance by a distance of at least seven pockets relative to rods 25, 26.

During this stacking process, the trailing rods 26 are disposed alongside the upper reach of the chain of pockets in the raised position 33' so that they act as abutment or guide rods during the formation of the stack, but their ends remain out of engagement with the cookies still in the pockets 13.

While the pockets 13 move downwardly while traveling around the chain wheels 15 on the outlet side of their travel path, each stack of cookies slides onto the bottom piece 17. Rods 25 and 26 straddle piece 17, as shown in FIG. 5, and project downwardly below that piece. Guide rods 26 are now in their lower position 33 and do their job of pushing the stack $8_1$ into transverse path 7 from where they are then moved on by pushers 38. In this apparatus pushers 38 also move continuously. There is sufficient clearance between stacks 8 to avoid difficulties during transfer from longitudinal path 6 to path 7.

The movements of shaft bottom 9 can be varied so that, for example, one pocket 13 is filled with two cookies and six pockets 13 are filled with one cookie each, whereby stacks of eight cookies 8 each can be formed. Other variations can be made to produce stacks having any odd number of cookies. Further, a much larger number of cookies, for example up to thirty, can be placed in each stack.

Apparatus providing three longitudinal paths, as shown, can easily form, for example, $3 \times 50 = 150$ stacks per minute and more. Due to the continuous movement of chains 14, 18, $18_1$ and 39, in addition to chains 10, there then results very smooth and safe operation of the device and gentle treatment of the material to be stacked. It is also possible to place more than two cookies into one pocket 13.

The movement of the abutment and guide rods 25 and 26 can of course also be effected in some other way.

FIG. 4 shows an alternative embodiment in which pockets 13 may be fastened to chains 14 in the opposite way, i.e. the pockets may be open toward the front instead of toward the back. The feeding fingers 12 then do not push the cookies completely into the bottom of the pocket and the cookies can slide therein under the influence of inertia forces.

In the operation of the embodiment of FIG. 4, $V_2$ must be greater than $V_1$. Guide rods 26' push the cookies successively onto the cookies disposed in successive preceding pockets. Neither of the vertical rods 25', 26' can be moved up and down and they are fastened to transverse rod 22 without a parallelogram linkage, rotation of rod 22 being prevented by arm 23. Therefore, guides 40 can be omitted or can be made to have the same height over their entire length if additional support for rods 25', 26' is desired. Vertical rods 25' serve as guides or abutments during the stacking process, particularly for the cookies disposed in the upper part of the stack.

When starting the apparatus and also in case of sudden stoppage the stacks of cookies could fall apart in the direction of movement. The rods 25' are provided to avoid this.

It is easily possible to vary the number of cookies to be stacked by varying the movements of bottom 9 during each feeding cycle. In principle, a pocket could be left empty during each cycle, but it is more advantageous to feed more pockets with only one cookie if the number of cookies in a stack is to be small.

It will be understood that the above description of the present invention is susceptible to various modifications, changes and adaptations, and the same are intended to be comprehended within the meaning and range of equivalents of the appended claims.

What is claimed is:

1. Apparatus for forming a succession of stacks each containing a selected number of flat items, comprising: means defining at least one chain composed of a succession of pockets, said chain having an upper reach extending between an inlet location and an outlet location and said chain being movable to cause said pockets to travel in succession along the upper reach over a conveying path from the inlet location to the outlet location; feeding means disposed at the inlet location for introducing at least one flat item into each pocket in succession; stack forming means composed of at least one pair of vertical abutment rods disposed above said pockets and movable along said conveying path, said rods being positioned to engage the at least one item in each pocket and control its movement over said conveying path; and means for moving said rods along said conveying path at a speed differing from the speed of travel of said pockets over said conveying path in a manner to cause said rods to push the at least one item from one said pocket onto the at least one item in an adjacent pocket to form the items into stacks.

2. An arrangement as defined in claim 1 wherein said means for moving cause said rods to move at a lower speed than said pockets so that said rods act as abutments as they engage at least one item in each said pocket.

3. An arrangement as defined in claim 2 further comprising: at least one pair of vertical guide rods movable as a unit with said pair of abutment rods and disposed behind said abutment rods, relative to the direction of movement of said abutment rods, for conveying a stack of items beyond the outlet location; and rod control means for lifting said guide rods above said pockets along the length of said conveying path for maintaining said guide rods out of engagement with items still in said pockets.

4. An arrangement as defined in claim 3 wherein said means for moving comprise three endless chains, with one of said chains being offset, relative to the other two chains, in the direction of the conveying path, said rods being connected to said chains in a manner to maintain said rods vertical over their entire travel path.

5. An arrangement as defined in claim 4 wherein said means for moving are arranged to advance said three endless chains continuously, and wherein said chain composed of a succession of pockets is arranged to be moved continuously.

6. An arrangement as defined in claim 1 wherein said means for moving cause said rods to travel at a higher speed than said pockets so that said rods act as conveying members as they engage the at least one item in each said pocket.

7. An arrangement as defined in claim 6 wherein said means for moving comprise three endless chains, with one of said chains being offset, relative to the other two chains, in the direction of the conveying path, said rods being connected to said chains in a manner to maintain said rods vertical over their entire travel path.

8. An arrangement as defined in claim 7 wherein said means for moving are arranged to advance said three endless chains continuously, and wherein said chain composed of a succession of pockets is arranged to be moved continuously.

9. An arrangement as defined in claim 1 wherein said feeding means comprise: a feed channel having an outlet portion in the form of a vertical shaft arranged to contain a series of items and presenting an outlet opening; a bottom member disposed below said outlet opening for supporting the items in said channel and vertically movable for controlling the number of items which will be positioned between said bottom member and said outlet opening; and item delivery means to cooperate with said bottom member for transferring such number of items from said bottom member into each said pocket in succession.

10. An arrangement as defined in claim 1 wherein there is a plurality of said chains each composed of a succession of pockets, said chains being arranged parallel to one another to present parallel conveying paths, and further comprising: a pair of side walls associated with each said chain and positioned to delimit the longitudinal sides of the associated conveying path; and means defining a stack removal path disposed beyond the outlet locations of said chains for receiving the stacks formed on said conveying paths and removing such stacks in a direction transverse to said conveying paths, said means defining a stack removal path including a further endless chain and a succession of pusher members carried by said further chain.

11. An arrangement as defined in claim 10 wherein there is at least one said pair of vertical abutment rods for each said chain.

12. An arrangement as defined in claim 11 wherein said means for moving are arranged to advance said rods continuously and said plurality of chains and further chain are arranged to be moved continuously.

13. An arrangement as defined in claim 10 further comprising: at least one pair of vertical guide rods associated with each said pair of vertical abutment rods and movable as a unit with its associated pair of abutment rods and disposed behind its associated abutment rods, relative to the direction of movement of said abutment rods, for conveying a stack of items beyond the outlet location of its associated chain; rod control means for lifting said guide rods above said pockets along the length of its associated conveying path for maintaining said guide rods out of engagement with items still in said pockets; means defining a fixed bottom associated with each said chain and disposed beyond the outlet location of its associated chain for supporting the stacks formed on its associated conveying path.

14. An arrangement as defined in claim 1 wherein each said pocket presents an item supporting surface which is inclined with respect to the horizontal by an angle of between 10° and 30° when said pocket is located on the upper reach of said chain.

15. An arrangement as defined in claim 1 wherein said means for moving are arranged to advance said rods continuously and said chain is arranged to be moved continuously.

* * * * *